C. W. THIESSEN.
Corn Planter.
No. 83,567.
Patented Oct. 27, 1868.
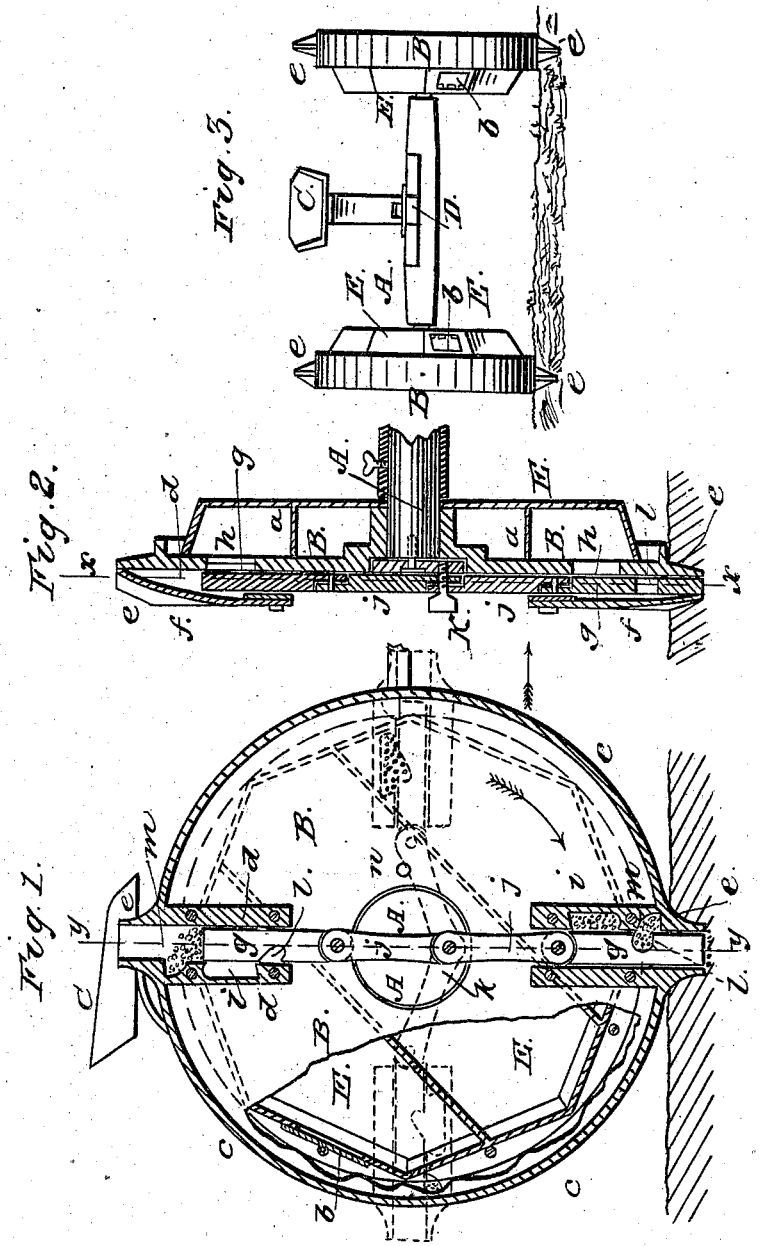
Witnesses
Wm. A. Morgan.
G. C. Cotton
Inventor
C. W. Thiessen
per Munn & Co
Attorneys

C. W. THIESSEN, OF EFFINGHAM, ILLINOIS.

Letters Patent No. 83,567, dated October 27, 1868.

IMPROVEMENT IN CORN-PLANTERS.

The Schedule referred to in these Letters Patent and making part of the same.

*To all whom it may concern:*

Be it known that I, C. W. THIESSEN, of Effingham, in the county of Effingham, and State of Illinois, have invented a new and improved Corn-Planter; and I do hereby declare that the following is a full, clear, and exact description thereof, which will enable others skilled in the art to make and use the same, reference being had to the accompanying drawings, forming a part of this specification.

Figure 1 represents a vertical section of my improved planting-wheel, the plane of section being indicated by the line $x\ x$, fig. 2.

Figure 2 is a vertical cross-section of the wheel, taken on the plane of the line $y\ y$, fig. 1.

Figure 3 is a front elevation of my improved corn-planter.

Similar letters of reference indicate corresponding parts.

This invention relates to a new corn-planter, which is so arranged that the wheels contain the seed-box and the dropping-apparatus, whereby a very secure and regular distribution of the seed is obtained.

The invention consists in such an arrangement of adjustable slides, that work on the face of the wheel, in boxes projecting from the face of the wheel, and in such a combination of the same with a seed-box, secured to the inner side of the wheel, that the requisite quantity of seed is dropped during each full, half, or other partial revolution of each wheel, and that such seed is, by such revolution of the wheel, not only dropped, but also securely embedded in the soil.

A, in the drawing, represents the axle of my improved seed-planter.

B B are the two wheels, hung loose on the ends of the axle.

C is the driver's seat, fixed to the axle.

D is the shaft or pole, projecting from the axle.

Each wheel B is a metal or other disk, fitted loosely around the end of the axle.

To the inner face of each wheel is secured a sheet-metal or other box, or pan, E, which forms a seed-receptacle, or, if it is, as in the drawings, divided by means of partitions $a\ a$, into a series of compartments, a series of seed-receptacles.

Each seed-receptacle is provided with a door, $b$, for allowing the insertion of the seed.

From the front face of each wheel B, projects forward a rim, $c$, and short ribs, $d\ d$, as shown in fig. 1.

These ribs project outside, beyond the rim of the wheel, and form, with a corresponding extension of the disk B, teeth, $e\ e$, as shown.

These teeth, as the wheel revolves, are forced into the ground.

Each pair of ribs forms the sides of a drop-box, of which the plate B is the back, a spring, $f$, the front, and a slide, $g$, the bottom.

Of these drop-boxes, there is a suitable number, corresponding to the number of seed-receptacles in the pan E. Each drop-box communicates with its opposite seed-receptacle by a perforation through the plate, B, which perforation is shown at $h$, in fig. 2. This perforation connects with a recess, $i$, in one of the ribs, as in fig. 1. Each drop-box has or is part of a projecting tooth, $e$.

Each slide $g$ is, by means of a connecting-rod, $j$, secured to the end of the axle A, the pivot-pin $k$, by which the rods are pivoted to the axle, being secured to the axle below the centre of the axis of the wheel. Thereby the slide will be pushed out to the end of its tooth, $e$, when it stands vertically below the axle, while it will be drawn down when it is vertically above the axle, as in fig. 1.

Into that edge of each slide $g$ which works along the recess $i$, is cut a notch, $l$, and a similar notch, $m$, is cut into the same rib in which the recess $i$ is arranged.

The spring $f$ constantly closes the outer end of each drop-box, unless the slide is pushed quite out, when it yields to the slide, as can be understood from fig. 2.

The operation is as follows:

When the apparatus is drawn forward, the wheel revolves in the direction of the arrow in fig. 1.

Supposing the slide and drop-box to be in a horizontal position in front of the axle A, then the notch $l$ in the slide is under the recess $i$, and is filled with seed from the seed-receptacle. The wheel revolving, the slide is gradually pushed outward until it is vertically below the axle. Then the seed, held in the notch $l$, is separated from the contents of the box E, and is, as the notches $l$ and $m$ come in line, deposited in the notch $m$.

As the wheel continues to revolve, the slide is drawn in again, leaving the seed in the notch $m$ undisturbed, until the slide and drop-box are vertically above the axle A. Then the slide is drawn down, as shown, and the seed drops out of the notch $m$ upon the end of the slide, as indicated in fig. 1.

The seed now remains in the outer end of the drop-box. When the latter arrives again in front of the axle, the recess $l$ is again filled, and then there are two lots of seed confined in the drop-box. The one that is in the outer end of the drop-box is pushed out into the ground by the slide, when the same is vertically below the axle. The other is carried all around once more, so as to be discharged in the same manner.

Thus each drop-box deposits one lot of seed during each revolution of the wheel, and if there are two or more such drop-boxes arranged on one wheel, there will be an equal number of hills planted during each revolution.

The seed cannot be blown away, after having been planted, as it is deposited at some length below the ground by the projecting portion $e$ of the drop-box.

When the dropping-apparatus is to be thrown out of gear, the pin K is taken out of the axle, and is fastened in a hole, $n$, provided in the plate B. Then the slides will not be operated, and seed will not be dropped.

It is evident that the planting-apparatus may be arranged on both or either one of the wheels of one corn-planter.

Having thus described my invention,

What I claim as new, and desire to secure by Letters Patent, is—

1. The drop-box, constructed as described, of the parallel ribs $d\ d$, one of which is provided within the seed-receptacles $i\ m$, as herein set forth and shown.

2. The circular seed-receptacle E, constructed as described, and secured to the inner face of the wheel B, within the flange $c$, as herein set forth and shown.

3. Pivoting the connecting-rods $j$ of the slides $g$ by means of a common pin, K, to the stationary axle of the revolving wheel, so that, by the revolution of the wheel, the slides will receive reciprocating motion in the drop-boxes, substantially as set forth.

4. The arrangement of the circular seed-receptacle E and slides $g$ upon opposite sides of the wheel B, as herein described, for the purpose specified.

C. W. THIESSEN.

Witnesses:
G. MIDDENDORF,
J. F. HOMANN.